(12) United States Patent
Rome (10) Patent No.: US 8,065,974 B1
(45) Date of Patent: Nov. 29, 2011

(54) APPARATUS FOR COATING AN ITEM WITH A DRY PARTICULATE MATERIAL

(76) Inventor: Howard M. Rome, Gloucester, MA (US)

( * ) Notice: Subject to any disclaimer, the term of this patent is extended or adjusted under 35 U.S.C. 154(b) by 1414 days.

(21) Appl. No.: 11/465,163

(22) Filed: Aug. 17, 2006

(51) Int. Cl.
*A01J 27/02* (2006.01)

(52) U.S. Cl. .................. 118/13; 118/16; 118/18; 118/19

(58) Field of Classification Search .................... 118/16, 118/18, 19
See application file for complete search history.

(56) References Cited

U.S. PATENT DOCUMENTS

| | | | |
|---|---|---|---|
| 1,330,589 A * | 2/1920 | James | 318/740 |
| 1,491,583 A * | 4/1924 | Cobb | 74/25 |
| 2,617,137 A | 11/1952 | Bodnar | |
| 2,655,354 A * | 10/1953 | Murray | 366/274 |
| 2,731,942 A | 1/1954 | Anderson | |
| 2,855,893 A | 7/1955 | Greer et al. | |
| 3,045,640 A | 7/1960 | Hill et al. | |
| 3,129,167 A | 4/1964 | Frangos | |
| 3,469,561 A | 9/1969 | Gordon | |
| 3,640,386 A | 2/1972 | Frangos | |
| 3,696,778 A | 10/1972 | Moore | |
| 3,738,313 A | 6/1973 | Heim | |
| 3,759,218 A | 9/1973 | Korstvedt | |
| 3,855,965 A | 12/1974 | Gordon | |
| 3,910,227 A | 10/1975 | Reece | |
| 3,915,116 A | 10/1975 | Booth | |
| 3,955,529 A | 5/1976 | Reed | |
| 3,967,583 A | 7/1976 | Booth | |
| 4,023,521 A | 5/1977 | Booth | |
| 4,138,209 A * | 2/1979 | Bahr | 425/160 |
| 4,182,260 A | 1/1980 | Reece | |
| 4,214,548 A | 7/1980 | Booth et al. | |
| 4,458,586 A | 7/1984 | Reed | |
| 4,496,084 A | 1/1985 | Booth et al. | |
| 4,534,858 A * | 8/1985 | Aldrich et al. | 209/236 |
| 4,550,677 A | 11/1985 | Reese et al. | |
| 4,798,283 A | 1/1989 | Booth et al. | |
| 4,862,824 A | 9/1989 | Reece | |
| 4,936,246 A * | 6/1990 | Reece | 118/22 |
| 4,936,248 A | 6/1990 | Miller | |
| 5,020,427 A * | 6/1991 | Kennefick et al. | 99/494 |
| 5,052,330 A | 10/1991 | Stacy | |
| 5,226,354 A | 7/1993 | Stewart | |
| 5,265,525 A | 11/1993 | Stewart | |
| 5,924,356 A | 7/1999 | Harper et al. | |
| 5,937,744 A | 8/1999 | Nothum, Sr. et al. | |
| 6,158,332 A | 12/2000 | Nothum, Sr. et al. | |
| 6,183,792 B1 | 2/2001 | Bettcher et al. | |
| 6,244,170 B1 | 6/2001 | Whited et al. | |
| 6,269,739 B1 | 8/2001 | Bettcher et al. | |
| 6,505,547 B1 | 1/2003 | Burnett et al. | |
| 6,531,170 B2 | 3/2003 | Hansen | |
| 6,598,519 B1 | 7/2003 | Thomas et al. | |
| 2003/0097939 A1 | 5/2003 | Garganta Riubrugent | |
| 2003/0113420 A1 | 6/2003 | Martin et al. | |
| 2003/0154915 A1* | 8/2003 | Rooke | 118/22 |
| 2004/0123746 A1 | 7/2004 | Patsalos | |
| 2005/0045049 A1 | 3/2005 | Muniga et al. | |

* cited by examiner

*Primary Examiner* — Dah-Wei Yuan
*Assistant Examiner* — Albert Hilton
(74) *Attorney, Agent, or Firm* — George A. Herbster (57) ABSTRACT

Apparatus for coating an item with a dry particulate material. An electrically operated sifter in a dry coating assembly generates a shower of the dry particulate material which coats the items held in an open mesh basket. A collector recovers residual material which can then be returned to the sifter. Extraneous clumps formed from the dry particulate material and any liquid coating can be readily removed from the sifter. An optional wet coating assembly allows an operator to coat the items with a batter before the application of the dry particulate material.

20 Claims, 11 Drawing Sheets

APPARATUS FOR COATING AN ITEM WITH A DRY PARTICULATE MATERIAL

BACKGROUND OF THE INVENTION

1. Field of the Invention

This invention generally relates to apparatus for applying a dry particulate material to an item and more specifically to apparatus for applying an edible coating, such as breading, to food.

2. Description of Related Art

Applying dry particulate material to an item is particularly prevalent in food preparation where this process is generally known as "breading". In breading, the dry particulate material may comprise bread crumbs, flour, meal or like materials. The item can comprise fish, shellfish, poultry, meat, vegetables or any other food item.

The prior art discloses two basic breading processes. In a first, a liquid material, commonly a batter, coats the item prior to the application of the dry particulate material. U.S. Pat. No. 3,910,227 (1975) to Reece discloses one such process where food is first coated in a batter bowl and then dredged in a pan of flour, the flour constituting a breading material. U.S. Pat. No. 5,020,427 (1991) to Kennefick et al. discloses the second process. Food is first dredged in flour, immersed in a batter and then dredged in flour again.

There are two basic market segments for breading apparatus that can implement either or both of these two approaches. One market segment includes industrial food processors that produce high volumes of products. U.S. Pat. No. 3,759,218 (1973) to Korstvedt discloses a breading apparatus for this market segment. It includes a food conveyor, a breading hopper that drops breading material onto the food, a breading recycler, pressure rollers, blowers and related electrical control circuits. These machines are complex to make and to use and expensive to operate. Requirements for extensive floor space for operation and operator training require a significant initial investment if the equipment is to operate efficiently. Investments of such a magnitude are generally only justified in high volume commercial breading or other coating processes.

Another market segment, commonly called the "food service segment," includes individual restaurants. For this market segment breading apparatus is generally used on an order-by-order basis. There are requirements for the food service segment that are antithetical to the apparatus requirements for high volume industrial production. For example, in the food service segment, breading apparatus must be easy to use with only minimal operator training. It must be compact to minimize the floor space requirements. The apparatus must operate with minimal maintenance and be easy to clean. It is a further advantage if the apparatus has the ability to minimize direct contact between the food and the operator.

Prior art breading apparatus appropriate for restaurant applications attain some, but not all, of the foregoing objectives. For example, U.S. Pat. No. 3,129,167 (1964) to Frangos discloses a combination breading table and power sifter which incorporates a driving arrangement for laterally vibrating a sifting component to break up clumps and beads (hereinafter "clumps") formed when the dry breading materials mix with the batter. In use, an operator loads food into a batter bowl in a counter and then dredges the wet food through a dry breading mixture in a pan, all by hand. When the quantity of clumps becomes objectionable, all the materials from the breading pan are loaded into the power sifter which then isolates the clumps. The sifted material then is transferred to the dredging pan. While this apparatus provides the breading function, it is overly complex to use and overly expensive to manufacture. This apparatus still requires an operator to handle the food during dredging. Further, no breading can occur during a sifting operation.

U.S. Pat. No. 3,696,778 (1972) to Moore discloses a breading machine with a lid. A rotatable container assembly located in a breading chamber is filled with breading material. Food is loaded into the container assembly. Rotation of the container assembly causes external vanes to lift and disperse the breading material over the food. Clumps are either broken up or directed to a drawer for subsequent disposal. This apparatus does not disclose any facilities for coating the food with batter or the like. Its design and manufacture are complex and costly. It also requires excessive maintenance and does not permit visual observation of the progress of the breading operation.

U.S. Pat. No. 3,910,227 (1975) to Reece discloses an apparatus for hand breading foods that includes a batter pan, a flour pan, a sifter and a catch pan on a common support. Breading material is applied by dredging the food through the breading material so an operator must physically touch the food during the breading process.

U.S. Pat. No. 4,458,586 (1984) to Reed discloses a combined breeder, marinator and preparation unit. Mixing occurs in a sealed, motor-driven mixing drum with a removable lid and agitator blades. After the breading process terminates, the drum tilts to discharge its contents onto a grate. Excess breading material falls through the grate into a catch basin. When an exit portal on the catch basin is removed, the breading material drops into a motorized sifter to be accumulated in a sifter catch pan for reuse. This structure is overly complex and costly, requires excessive maintenance and training and does not permit visual observation of the breading process progress.

The previously described U.S. Pat. No. 5,020,427 includes a support that defines a plurality of laterally disposed stations. A fry basket rack at a first station receives breaded food that was dredged manually in flour at a second station and then moved to a sifter basket. The sifter basket moves to a batter station and the food transfers to a batter basket. After immersing the food and the batter basket in the batter, the food is transferred back to the sifter basket that moves to the second station for further manual dredging. The sifter basket provides a tumbling operation with the excess breading dropping back into the flour pan. The sifter basket retains any clumps that are formed during the process. As the contents of the basket are returned to a fry basket rack, clumps transfer through a chute in the sifter to a trough. This apparatus requires manual handling of food. It includes various mechanisms for rotating baskets and performing other operations that increase the initial cost of the apparatus and the complexity and costs of training and use.

None of the foregoing or other prior art breading processes and apparatus have succeeded in providing, in a simple apparatus, all of the desirable features of breading apparatus for use in the food service segment. What is needed is affordable apparatus for depositing a dry particulate material, such as a breading mixture, onto an item, such as food, that allows an operator to observe the process visually in real time, but without handling the food by hand directly, that requires minimal space, that is easy to use with minimal training, that is easy to maintain and clean and that provides both the wet coating and dry coating operations required for breading.

SUMMARY

Therefore, it is an object of this invention is to provide apparatus for applying a dry particulate matter, such as a breading mixture, to an item, such as food, that is particularly adapted for use in low volume applications peculiar to restaurants and other food service segment establishments.

Another object of this invention is to provide such a coating apparatus that is compact and has a low acquisition cost.

Still another object of this invention is to provide a coating apparatus that requires minimal training for use.

Yet another object of this invention is to provide a coating apparatus that allows an operator to observe the coating process in real time for maximum efficiency and quality.

Still yet another object of this invention is to provide a coating apparatus that does not require an individual to handle the item with his or her hands.

Yet still another object of this invention is to provide a breading apparatus that provides both the wet coating and dry coating operations at one location in an efficient manner.

Still yet another object of this invention is to provide breading apparatus that complements deep frying and other equipment peculiar to the food service segment.

In accordance with one aspect of this invention, apparatus for coating an item with a dry particulate material includes a support. A sifter attaches to the support for producing a shower of sifted, dry particulate material. A collector attaches to the support below the sifter thereby to define an intermediate coating station. A basket carrying the item is inserted into the coating station for coating when the sifter operates. The collector receives residual material that fails to adhere to the item during the operation.

In accordance with another aspect of this invention, apparatus for breading food comprises a support having a counter and a vertical panel extending above the counter that defines the location of a wet coating site and a breading site. The counter supports a batter receptacle at the wet coating site. An assembly at the breading site includes a sifter assembly attached to the vertical support for producing a shower of sifted, dry particulate material. A collector assembly carried by the counter below the sifter assembly defines an intermediate coating station. A basket carrying the food is positioned in the coating station for coating when the sifter assembly operates. The collector receives residual material that fails to adhere to the material during the operation.

In accordance with a more specific embodiment of this invention, breading apparatus for food items includes a cabinet that supports a wet coating assembly and a dry coating assembly. The cabinet has a counter and a vertical back panel that defines a batter application site and a breading application site and has at least one compartment below the counter at each of the batter and breading application sites, the counter having first and second openings therethrough at the batter and breading application sites, respectively.

In this embodiment, the wet coating assembly at the batter application site has a batter bowl supported by the counter at the first opening for containing a volume of batter and a dipping basket for dipping food items in the batter in the batter bowl whereby an operator is enabled to coat the food items in the batter and drain excess batter back into the batter bowl. The dry coating assembly at the breading application site has a dry coating basket for enabling the operator to transfer coated food items from the dipping basket and an electrically operated sifter attached to the vertical back panel for producing a shower of sifter breading material.

The sifter includes an electrically operated drive for producing reciprocating motion, a switch for controlling the operation of the drive, a support ring, spaced parallel rails attached to the panel proximate the drive for enabling the support ring to reciprocate in a horizontal plane, detachable connection means for connecting the support ring to the drive and a tray removably carried in the support ring having a screen thereacross for sifting breading material placed in the tray when the tray reciprocates with the ring.

A collector is supported by the counter at the second opening below the sifter thereby to define a coating station therebetween. The collector includes a chute having a support flange and first and second sloped walls extending relative to said support flange to form a gap therebetween, and a collection vessel in a compartment below the receiver thereby to collect residual breading material that passes through the chute.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
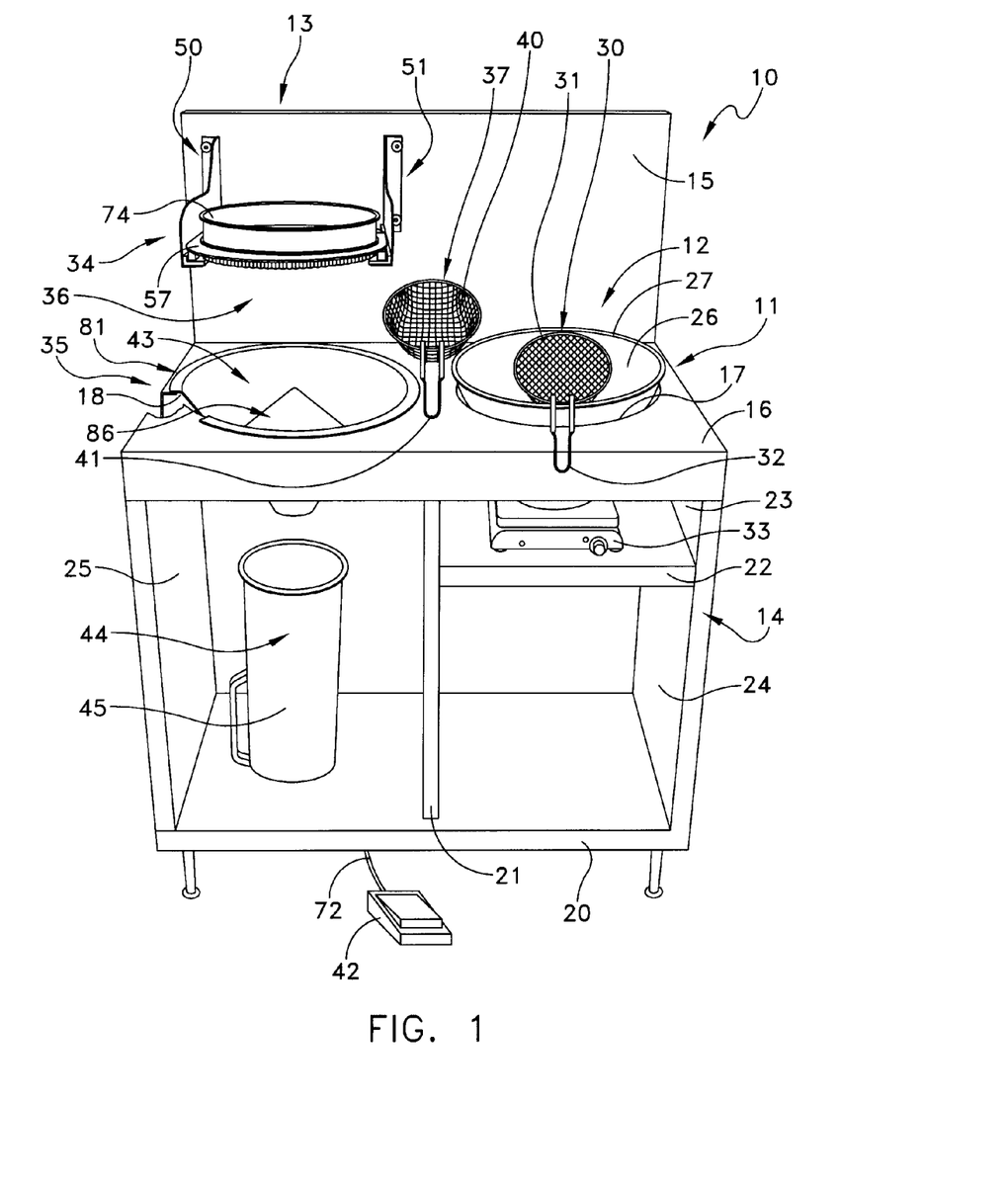
FIG. 1 is a perspective view of the apparatus embodying this invention.

FIG. 1 discloses one embodiment of a breading apparatus 10 as an example of apparatus embodying this invention for coating an item with a dry particulate material. The apparatus includes a support 11 that serves as a base for a wet coating assembly 12 and a dry coating assembly 13 at corresponding wet and dry coating sites.

In FIG. 1, the support 11 is in the form of a cabinet 14 with a vertical planar back panel 15 extending above a counter 16 with two cut outs or openings 17 and 18. A bottom shelf 20 and a vertical partition 21 define structures that are generally coextensive with the wet coating assembly 12 and the dry coating assembly 13. An optional shelf 22 spans the compartment below the wet coating assembly 12. These shelves and petitions then form storage compartments 23 and 24 below the wet coating assembly 12 and a storage compartment 25 below the dry coating assembly 13.

The wet coating assembly 12 includes a batter bowl 26 that passes through the cut out 17 to be supported by a peripheral flange 27 that normally rests on portions of the counter 16 proximate the opening 17. In FIG. 1 the batter bowl 26 is slightly elevated to depict the cutout 17 more clearly. A conventional dipping basket 30 includes an open-mesh container 31 and a handle 32. The batter bowl 26 contains batter or other appropriate wet coating material. If the material in the batter bowl 26 remains in suspension, no additional equipment may be required. However, if agitation is required to maintain suspension, a standard electro-magnetic stirrer 33 can be positioned on the shelf 22 in the compartment 23 below the batter bowl 26 to maintain batter consistency. Such stirrers and their use are well known in the art.

The dry coating assembly 13 includes an electrically operated sifter 34 in an elevated position and a collector 35 at a lower position thereby to define an intermediate coating station 36. A conventional dry coating basket 37 with an open-mesh container 40 and a handle 41 provides a means for inserting items into the coating station 36.

Basically, an operator lowers the dipping basket 30 and food into the batter in the batter bowl 26 to coat the food with the batter. After removing the dipping basket 30 and allowing excess batter to drain from the food, the operator transfers the food to the dry coating basket 37 and positions it in the coating station 36. The operator then activates the sifter 34 as by pressing a foot switch 42 or by operating some other control to produce a shower of sifted breading or other particulate material that passes through the coating station 36. A portion of that material adheres to the items in the dry coating basket 37. The rest drops into the collector 35, specifically through a chute assembly 43, to be received in a collection vessel 44 such as a pitcher 45 for reuse as described later.

Figure 2:
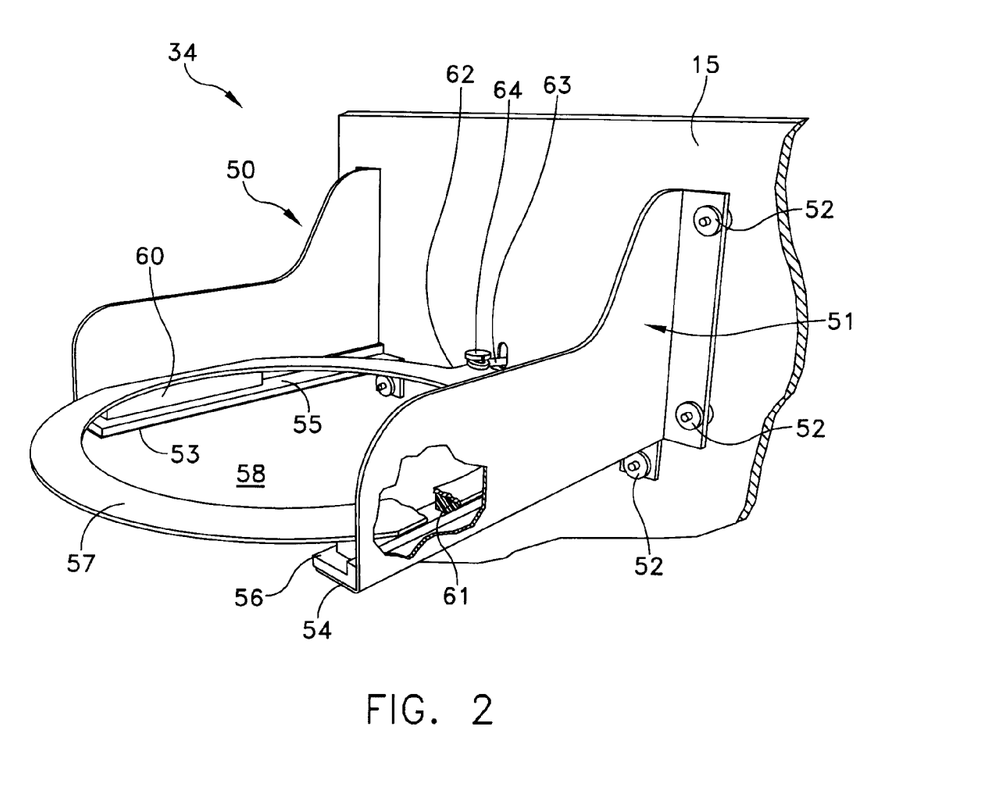
FIG. 2 is a detailed perspective view of a portion of a sifter utilized in the apparatus of FIG. 1.

Referring now to FIGS. 1 and 2, the electrically operated sifter 34 includes brackets 50 and 51 that are mounted to the back panel 15. In a preferred embodiment, a plurality of thumb nuts and bolts, some of which are designated by reference 52 in FIG. 2, mount the brackets 50 and 51 to the back panel 15. The brackets 50 and 51 incorporate horizontally extending rails 53 and 54 respectively. The rails 53 and 54 extend along axes that are normal to the back panel 15 to define the upper and horizontal limits of the coating station 36 in FIG. 1. Still referring to FIG. 2, the horizontal rails 53 and 54 additionally include L-shaped slides 55 and 56, respectively, formed of nylon or other low friction material to provide a channel for receiving a support ring 57.

As shown in FIG. 2, the support ring 57 defines a large circular opening 58 and includes slides 60 and 61, also of a low friction material, which ride in the channel defined by the slides 55 and 56, respectively. This structure with the counterfacing, abutting, low-friction sliders 55 and 60 and 56 and 61 enables the support ring 57 to undergo reciprocal motion in a plane, typically a horizontal plane that is orthogonal to the back panel 15, with minimal friction.

Figure 3:
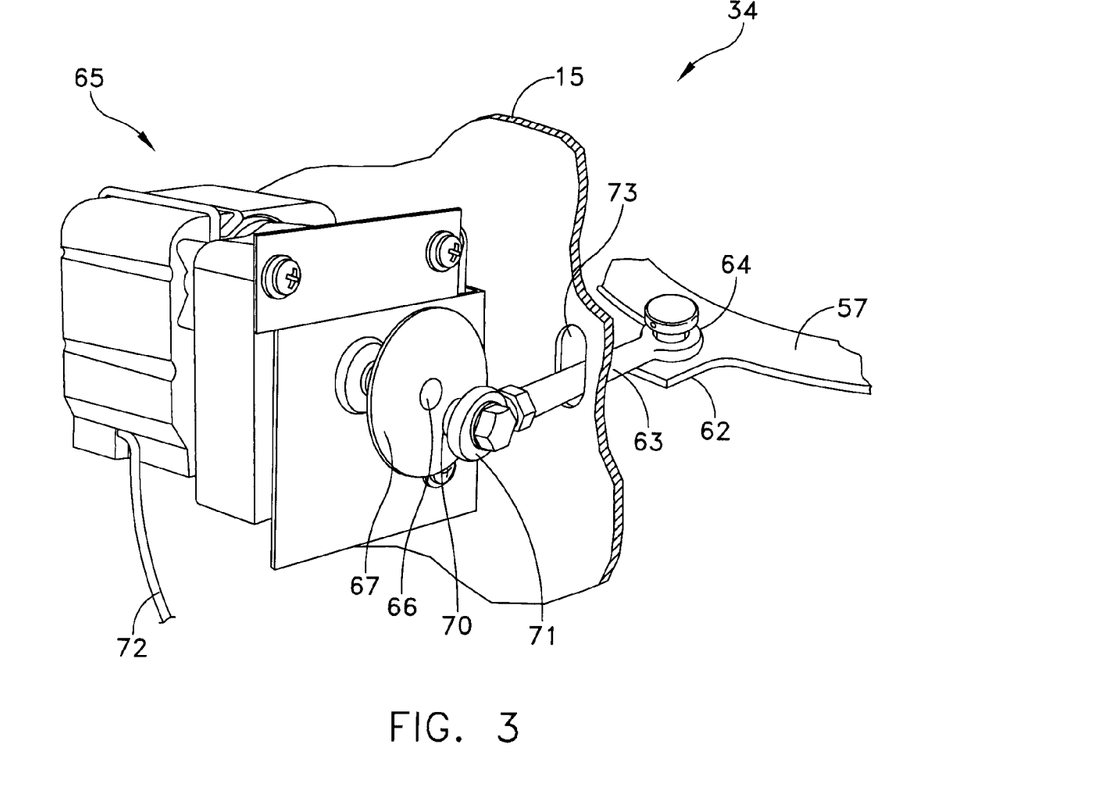
FIG. 3 is a perspective view of a drive for operating the sifter of FIGS. 1 and 2.

Referring specifically to FIGS. 2 and 3, the support ring 57 includes a radial tab 62 extending toward the back panel 15 that connects to one end of a reciprocating drive rod 63 by means of a detachable, loose coupling 64. Referring now to FIG. 3, the other end of the drive rod 63 attaches to a motor drive 65 with an output shaft 66 that includes a low speed motor and speed reduction gear to produce rotary motion.

In a preferred embodiment, the output shaft 66 rotates at about 160 rpm. The output shaft 66 rotates a disk 67 with an eccentric pin 70 rotatably and detachably connected to the other end of the drive 63 by a connector 71. The loose coupling 64 accommodates the vertical motion of the drive rod 63 at the motor drive 65 as that end moves vertically during rotation of the motor drive 65.

The foot switch 42 in FIG. 1, that connects to the motor drive 65 by conductors 72 and is a simple "ON/OFF" switch that, when activated, energizes the motor drive 65. Such a switch could be replaced with a variable speed motor control for applications in which a variable sifting rate is available.

As shown in FIG. 3, the drive rod 63 passes through a vertically elongated slot 73 in the back panel 15 to accommodate vertical, angular displacement during operation. The eccentric pin 70, connector 71, drive rod 63 and connection 64 constitute a rotary-to-reciprocal motion converter whereby when the support ring 57 reciprocates or vibrates at a rate corresponding to the angular velocity of the output shaft 66. That is, if the output shaft 66 rotates at 160 rpm, the support ring 57 reciprocates or vibrates at 160 cycles per minute.

Figure 4:
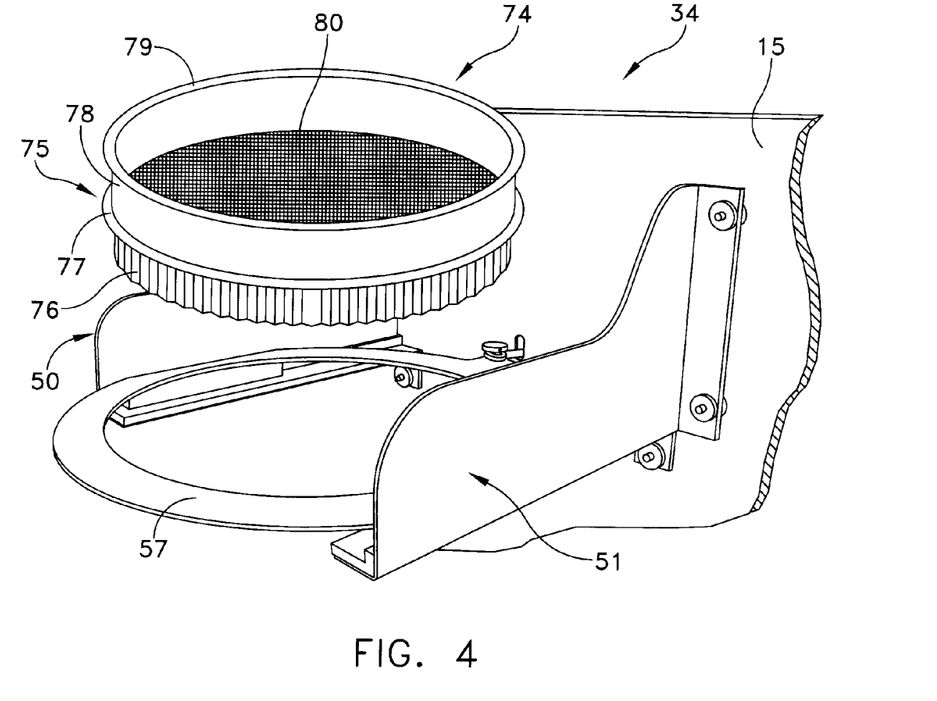
FIG. 4 is an exploded view of the sifter shown in FIG. 1.

FIG. 4 depicts the details of the connection between the support ring 57 and a removable sifter tray 74, also shown in FIG. 1, that includes a perpendicular or cylindrical peripheral housing 75 with a lower wall 76, an intermediate circumferential bead 77 and an upper cylindrical wall 78 that terminates in a lip 79. A screen 80 spans the housing 75 in a plane approximately coextensive with the circumferential bead 77. The screen 80 will be characterized by a mesh size that is optimal for a specific breading size. If a breading apparatus of this invention is to be used with different breading mixtures, an array of sifter trays can be provided, each with a screen of optimal mesh size.

The lower wall 76 constitutes an extension that facilitates the insertion and removal of the sifter tray 74 with respect to the support ring 57 supported by the brackets 50 and 51 for purposes of cleaning, particularly for dumping accumulated clumps into an appropriate receptacle. In this embodiment, the lower wall 76 defines a cylinder with peripheral, axially extending corrugations. Other implementations can include a lower wall that defines a smooth cylindrical structure or a slightly tapered conical structure. The screen mesh has a size that allows the dry material to shower down from the sifter 34 through the coating station 36 into the collector 35 of FIG. 1.

Still referring to FIG. 1, when an operator transfers food in the dry coating basket 37 into the coating station 36 and energizes the sifter 34, dry particulate breading material falls in the shower of dry breading material. Three actions can occur during this process. First a portion of the breading material adheres to the food in the basket 37. The operator can judge when the appropriate level of coating has been reached. The remaining portion of the material, that constitutes residual breading material that fails to adhere to the items in the basket 37, falls into the collector 35. Any clumps formed by the batter and dry breading material drop through the basket 37 into the collector 35. If the food in the basket has not been fully drained, batter may also drip into the collector 35.

Figure 5:
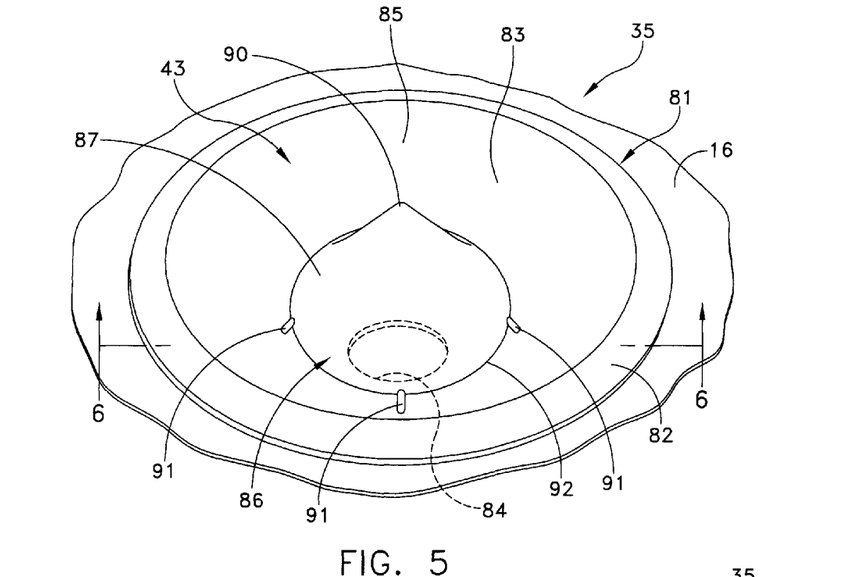
FIG. 5 is a perspective view of a collector apparatus shown in FIG. 1.
Figure 6:
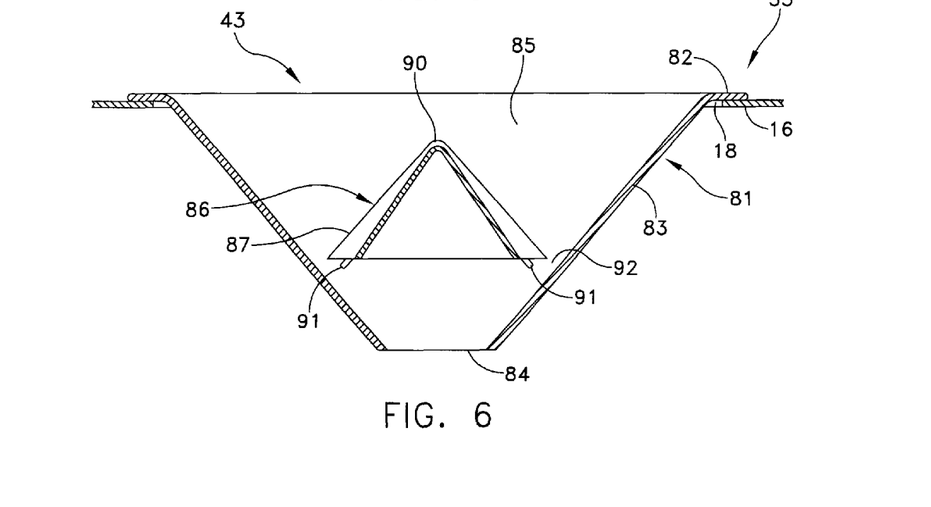
FIG. 6 is a cross-section taken along lines 6-6 in FIG. 5.

The collector 35 receives the residual breading material, clumps and any batter. FIGS. 5 and 6 depict one embodiment of the collector 35 in detail. In this specific embodiment the chute assembly 43 includes a frusto-conical bowl 81, also shown in FIG. 1, with an upper flange 82 that rests on the counter 16 at the cutout 18. A conical side wall 83 tapers to an opening 84 at the bottom of the bowl 81. An upper opening 85 circumscribed by the flange 82 has a sufficient area to receive dry material that showers down from the sifter 34 in FIG. 1. The bottom opening 84 directs residual material and clumps the pitcher 45.

The chute assembly 43 also includes a conical deflector 86, also shown in FIG. 1, with a tapered side wall 87 that terminates at the end opposite an apex 90 with standoffs 91 that engage the tapered side wall 83. The standoffs 91 allow ready transfer of both the dry particulate residual material and typical clumps through a gap 92 between the walls 83 and 87 to pass through the opening 84. However, any batter that drips from the basket 37 during the operation strikes the conical deflector 86 and spreads over the surface of the conical wall 87. The surface tension is sufficient to prevent the batter from dripping into the pitcher 45.

Referring again to FIG. 1, in use, an operator places food in the dipping basket 30 of FIG. 1 and immerses the food in the batter bowl 26 to coat the food. Then the operator lifts the dipping basket 30 out of the batter bowl 26, allows the contents to drain and transfers the food to the dry coating basket 37. This transfer minimizes the transfer of batter to the dry coating apparatus 13. Next the operator positions the dry coating basket 37 below the sifter 34 in the coating station 36. The operator then activates the sifter 34 as by activating the foot switch 42 to produce the shower of breading material that coats the food. During this process the operator observes the coating process visually, in real time, and can toss the food to assure complete coating. When the operator is satisfied, the operator releases the foot switch 42. The shower of material ceases and the food in the basket 37 is ready for further processing as by cooking. The only handling of the food by hand during this process may be during the initial loading of the dipping basket 30 or the removal of the breaded food from the dry coating material.

During this process, the chute assembly 43 directs any residual material to the pitcher 45. When the sifter tray 74 empties, the operator ceases operation, withdraws the pitcher 45 and refills the sifter tray 74. Makeup material can also be added to the sifter tray 74 at this point. To the extent that the residual material returns to the tray 73 includes clumps, the sifting operation either breaks up the clumps and allow dry materials to pass through the coating station 36 or the clumps merely remain in the tray 74 above the screen 80. Then it is a simple matter for the operator to lift the tray 74 out of the support ring 57 to dispose of any clumps remaining in the tray 74.

Figure 7:
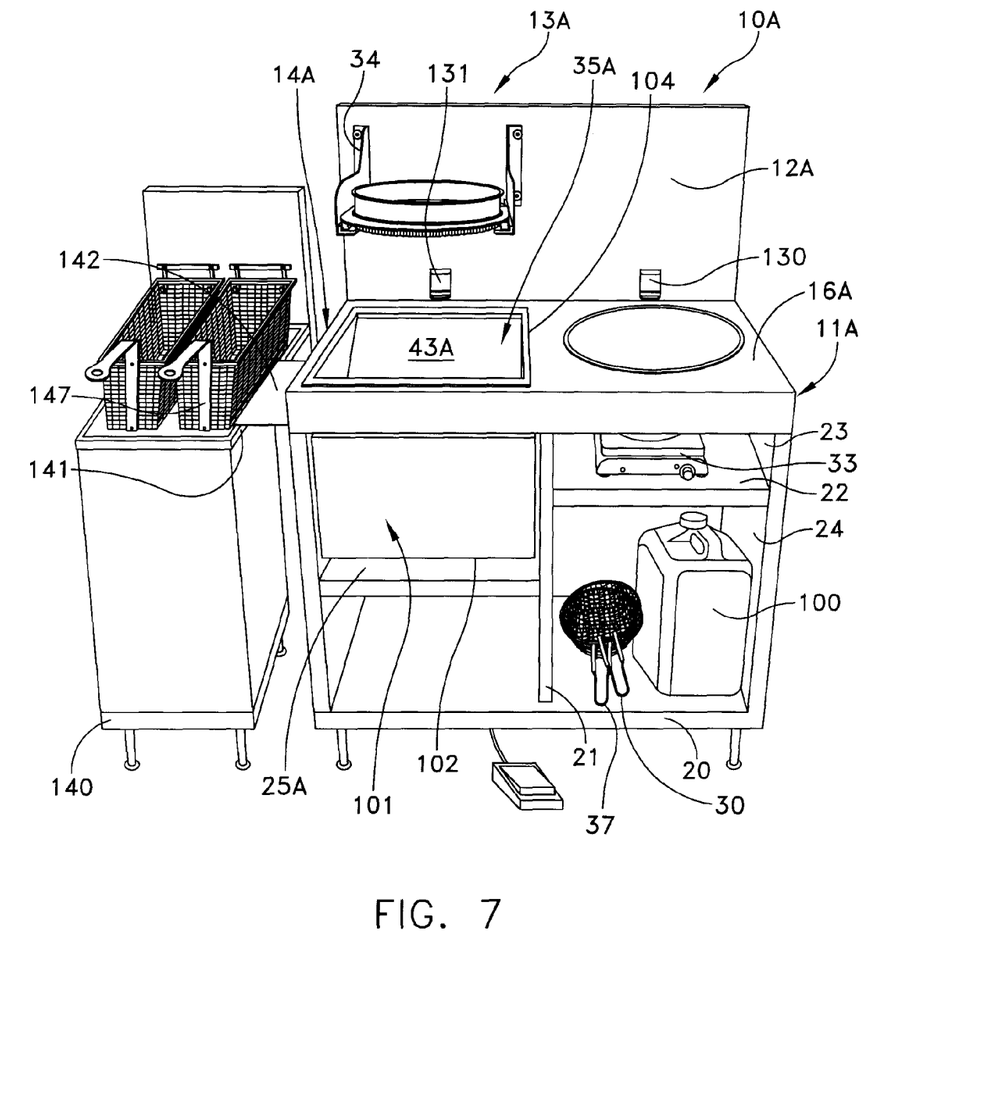
FIG. 7 depicts an alternate embodiment of apparatus with a complementary deep fat fryer.

As will be apparent there are a number of variations and modifications that can be made to the apparatus disclosed in FIG. 1. FIG. 7 shows one such embodiment and uses the same reference numerals to identify corresponding components. Reference numerals with the suffix "A" refer to modified but equivalent components.

In FIG. 7 a breading apparatus 10A comprises a support 11A with a wet coating station 12A, a dry coating station 13A and a cabinet 14A. Support 11A, namely the cabinet 14A, has a similar structure as that shown in FIG. 1 including the bottom shelf 20, an internal vertical partition 21, a shelf 22, a compartment 23, with an electromagnetic stirrer 33, and a storage compartment 24. In FIG. 7 the compartment 24 stores baskets 30 and 37 and a container 100 of batter material.

In its basic form the dry coating assembly 13A includes a sifter 34 and a collector 35A. The collector 35A includes a receptacle 101 in the form a drawer 102 mounted in a compartment 25A. A rectangular cutout 18A replaces the circular cutout 18 shown in FIG. 1 for receiving a one-piece chute assembly 43A.

Figure 8:
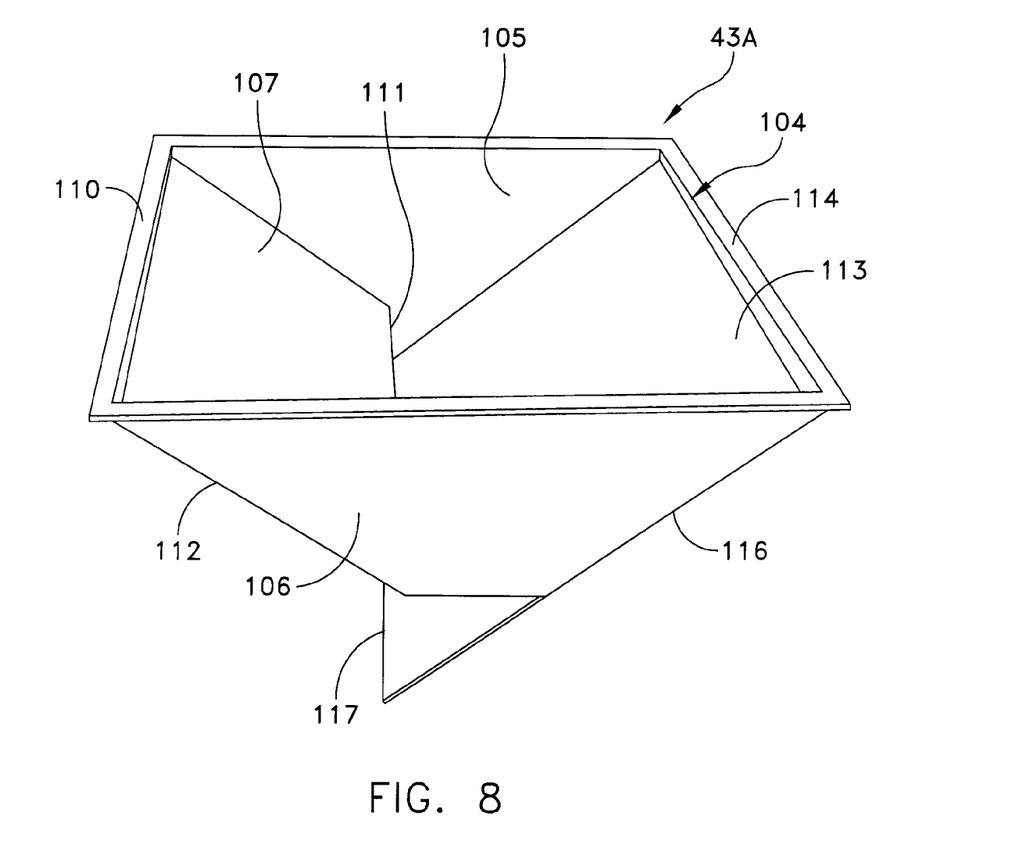
FIG. 8 is a perspective view of an alternative embodiment of a chute for use in the apparatus of FIG. 1 or 7.
Figure 9:
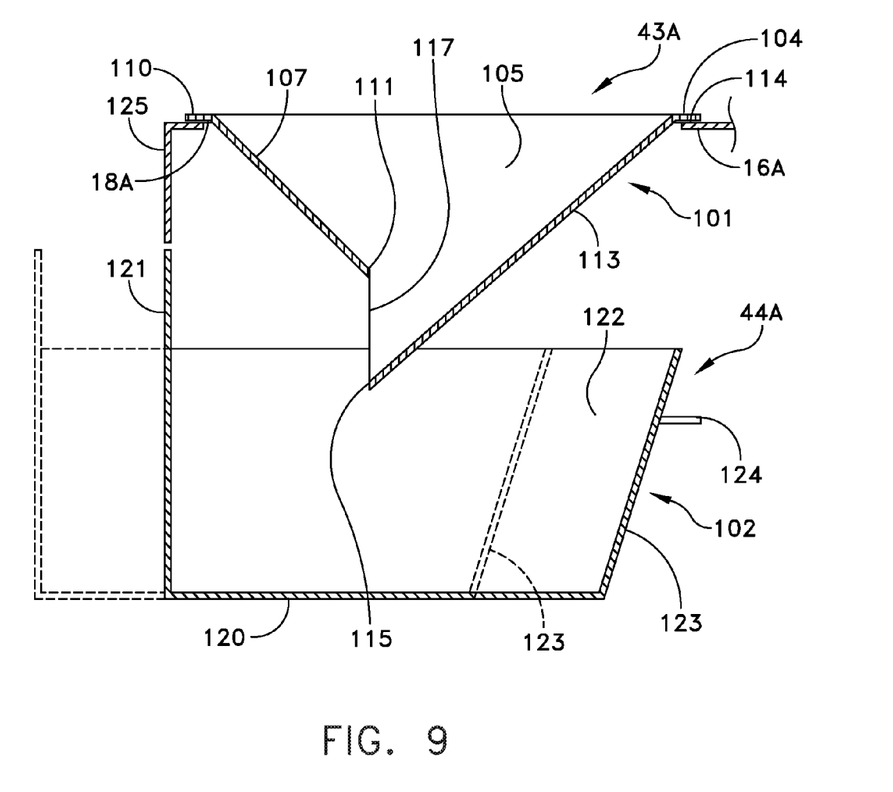
FIG. 9 is a simplified cross section depicting the relationship between the components of the collector.
Figure 10:
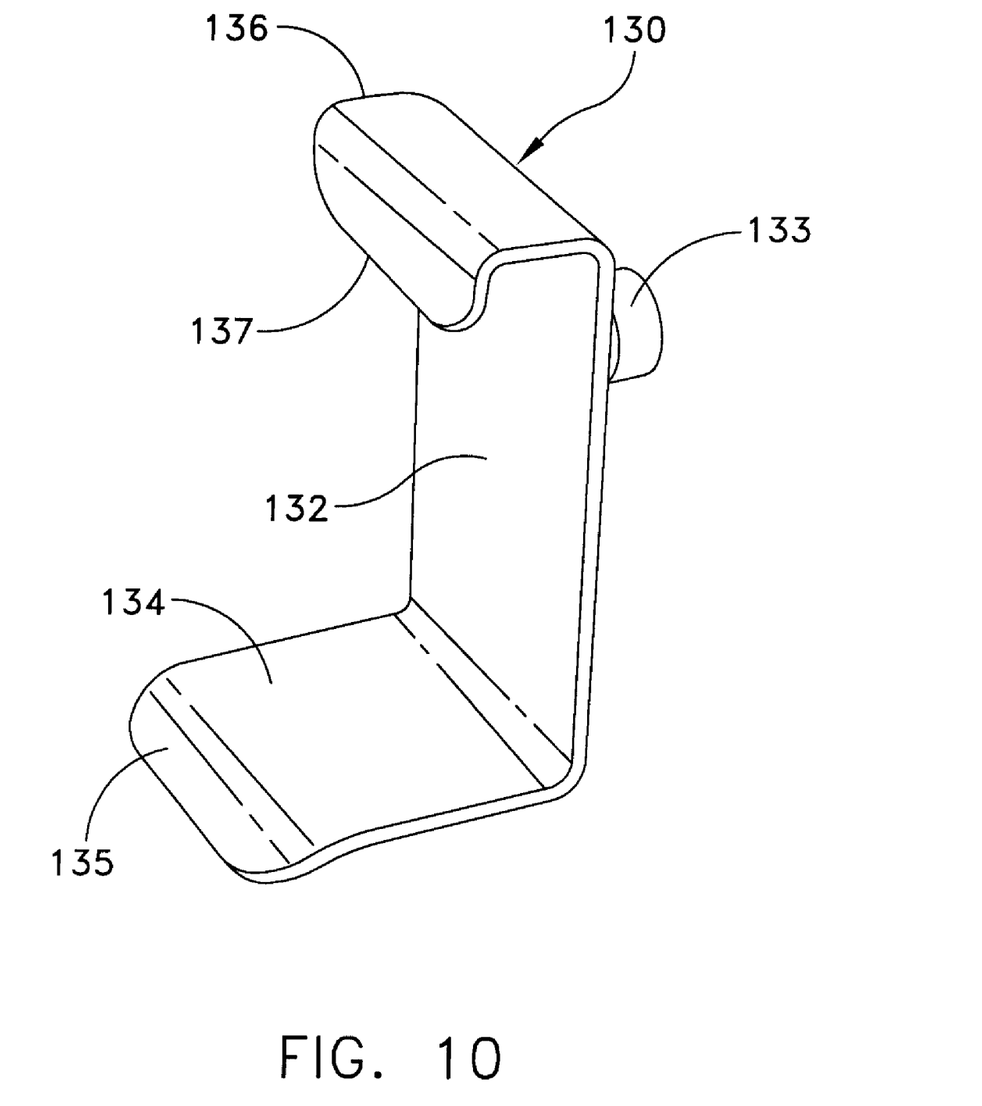
FIG. 10 depicts the apparatus with baskets stored in hanger brackets according to FIG. 8.

Referring now to FIGS. 7, 8 and 9, the chute 43A includes a rectangular peripheral flange 104 that overlies the edge of the counter 16A at the edge of the cutout 18A. Referring specifically to FIGS. 8 and 9, side walls 105 and 106 depend from the flange 104. A first sloping wall 107, attached to the side walls 105 and 106, slopes down from a front lip 110 of the rectangular flange 104 to an edge 111. The wall 107 has a slope as shown by the corner 112 in FIG. 8. Similarly, a rear wall 113 slopes down from a rear lip 114 to an edge 115. The slope is evident by looking at the corner 116 in FIG. 8. The slopes are opposite and have different magnitudes. Consequently a gap 117 exists between the edges 111 and 115.

When the chute 43A is positioned in the cut out 18A, residual material from the sifter 34 strikes both the sloped walls 107 and 113 and slides down through the gap 117 into the drawer 102. Wet material tends to stay on the walls 107 and 113 thereby to minimize the transfer of liquid material into the drawer 102.

As shown in FIG. 9, the drawer 102 includes a bottom panel 120, a vertical front wall 121, side walls including a left side wall 122 shown in FIG. 9 and a rear wall 123. The rear wall 123 slopes up and to the right in FIG. 9. Drawer slides, such as a drawer slide 124 shown partially in FIG. 9, allow the drawer 102 to be withdrawn from the "closed" position as shown by the solid lines. In the closed position, the drawer 102 forms a receptacle that receives residual material from the chute 43A that passes through the gap 117.

When an operator wants to remove accumulated material in the drawer 120, the operator opens the drawer 102 to a "fully open" position shown by the dashed lines. This provides ready access between a front panel 125 on the cabinet and the material in the drawer 102. In this position the rear wall 123 is still behind the gap 117. Consequently the drawer 102 will capture any residual material flowing through the gap 117 in either the fully opened, closed or any intermediate drawer position.

Figure 11:
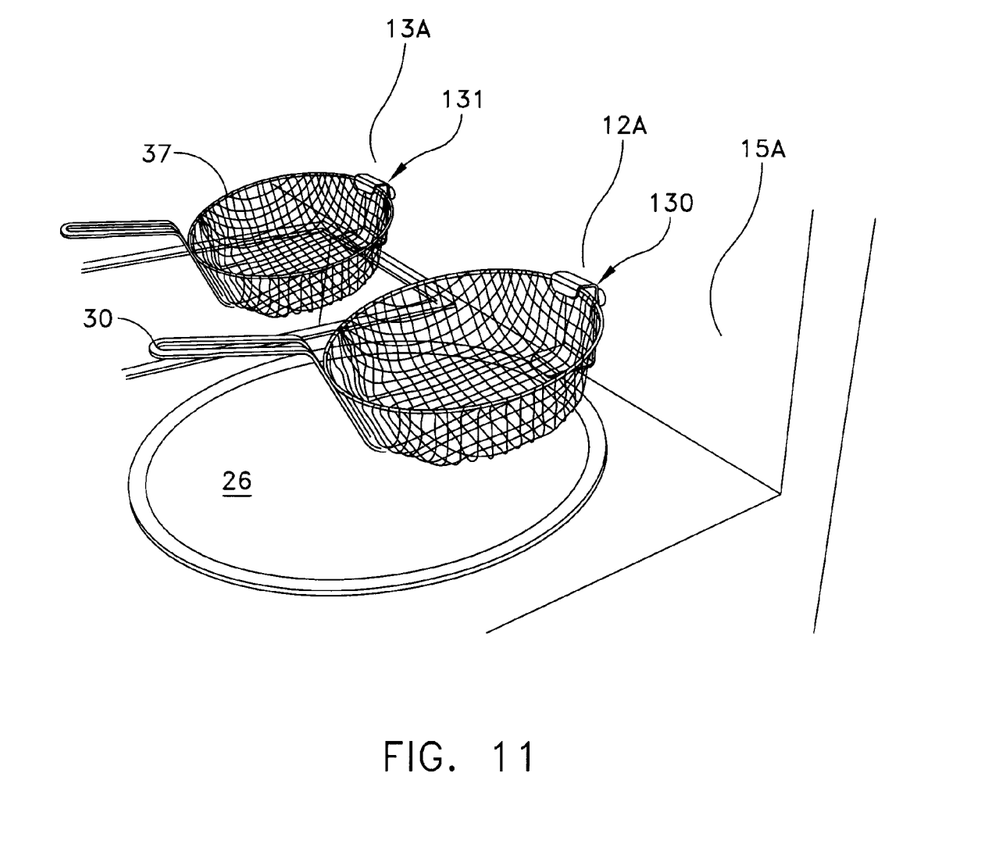
FIG. 11 depicts a hanger bracket for storing a basket.

FIGS. 7 and 11 depict another feature that is incorporated in the apparatus of FIG. 7 and that can be incorporated in the apparatus of FIG. 1 in the form of basket hangers. Specifically, FIG. 7 depicts two basket hangers 130 and 131 as part of the wet coating apparatus and dry coating apparatus, respectively. Referring specifically to FIG. 11, the hanger 130 has a vertical back panel 132 affixed to the cabinet by a standoff fastener 133. A bottom extension 134 terminates in a guide lip 135. The upper end of the hanger 130 terminates in an inverted U-shape 136 that extends to a free edge 137. The distance between the bottom extension 134 and the free edge 137 is sufficient to accommodate a basket, such as the baskets 30 and 37 as shown in FIG. 11. Specifically, an operator mounts the basket 30 to a hanger 130 merely by raising the basket handle, sliding the upper edge of the basket into the channel formed by the U-shape 136 and then moving the handle down to seat the bottom of the basket on the bottom extension 134. A reverse operation allows the operator to remove a basket. The hangers 130 and 131 provide a ready accessory for enabling a basket to be positioned temporarily either between operations or during an operation thereby freeing the operator to perform other needed functions.

Figure 12:
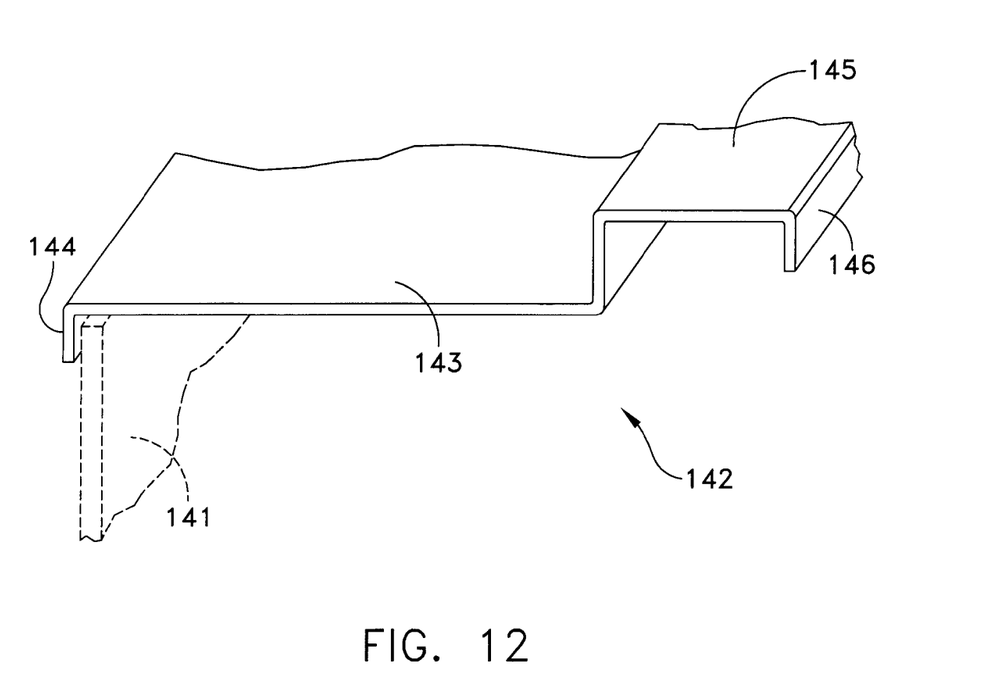
FIG. 12 is a detail of a counter extension also shown in FIG. 7 that is useful in integrating the operations at the breading apparatus with operations at a deep fat fryer.

FIG. 7 also depicts the apparatus 10A in a position proximate a deep fat fryer 140 that includes a proximate side wall 141 adjacent an opening into the frying vat. A readily removable bridge 142 spans the space between the apparatus 10A and the fryer 140. The bridge 142 is formed by stamping, shaping or other machining process and comprises a central panel 143 as shown in FIG. 12 that terminates in a downwardly extending lip 144. The lip 144 overlies a portion of the fryer wall 141, as shown in phantom, for support. At the other side of the bridge 142, the panel terminates in an inverted channel 145 with a lip 146. The channel and lip overlie the apparatus 10A with the lip 146 being located within the chute 43A.

This bridge 142 is particularly useful during the transfer of breaded material from the dry coating basket 37 to a frying basket 147. More specifically, the frying basket 147 can be held over the bridge 142 while the coated food items are transferred from the dry coating basket 37. Then the dry coating basket 37 can be replaced in the hanger 131 and the frying basket transferred into the heated oil. Any residual material is captured on the surface of the panel 143 and can be easily cleaned either by wiping the panel in place or by merely lifting the bridge 142 from the apparatus for cleaning.

Apparatus constructed in accordance with either of the foregoing embodiments of this invention meets all the desirable characteristics for applying a dry particulate material to an item such as breading to food. The apparatus provides both wet and dry coating operations in a single structure. Training for use is minimized as the only control added to the normal breading operations is the foot switch or equivalent control for initiating the shower of dry particulate material. During this operation the operator can observe the coating process visually to assure appropriate quality of breading. There is no manual handling of material, as by hand-dredging food through flour and the like. From a facilities and overhead standpoint, the apparatus is compact and minimizes any floor space requirements. It obviously can even be placed on rollers to be moved according to need. The breading apparatus is easily maintained and cleaned. Specifically, each of the components of the system, such as the batter bowl 26, the elements forming the sifter 34 and the collector 35 are all readily disassembled for cleaning.

It will be apparent that a number of variations can be made to this structure without departing from the spirit and scope of this invention. For example, the sifter 34 is disclosed with a specific cylindrical structure with a corrugated portion for being inserted in a ring to facilitate removal and disposal of extraneous materials. Other configurations using electrical, pneumatic or mechanical drives and sifters could be used to produce a shower of dry particulate material for coating an item in a chamber. Two specific collectors have been disclosed. Other collectors could be substituted. As previously indicated, in some applications the requirement for an electromagnetic stirrer may not be required. Therefore, it is the intent of the appended claims to cover all such variations and modifications as come within the true spirit and scope of this invention.

What is claimed as new and desired to be secured by Letters Patent of the United States is:

1. Apparatus for hand breading food items by applying a dry particulate breading material to batter-covered food items, said apparatus comprising:
   A) a support with a counter that defines, in a vertical alignment, a sifter station spaced above said counter, a coating station intermediate the sifter station and said counter, and a collection station extending downwardly from said counter,
   B) sifter means for sifting dry particulate matter to produce a shower of sifted dry particulate material, said sifter means being attached to said support at the sifter station,
   C) basket means for inserting a batter coated food item into the coating station whereby the food item in said basket means is coated with at least a portion of the sifted dry particulate material when said sifter means operates and produces the dry particulate breading material shower, and
   D) collector means for receiving residual material that fails to coat the food item in said basket means, said collector means being attached to said support at the collection station.

2. Apparatus as recited in claim 1 wherein said sifter means comprises:
   i) container means for receiving dry particulate breading material, said container means including a peripheral housing and spanning screen, and
   ii) vibrating means for vibrating said container means thereby to produce during operation of said sifter means the dry particulate breading material shower, said vibrating means being connected to said base.

3. Apparatus as recited in claim 2 wherein said vibrating means includes:
   a) means for producing reciprocal motion,
   b) a support ring attached to said reciprocal motion producing means, and
   c) means on said support at the sifting station for carrying said support ring for reciprocal motion in a horizontal plane, and
   d) an electric motor connected to said reciprocal motion producing means.

4. Apparatus as recited in claim 3 wherein said peripheral housing includes an extension for passing through said support ring whereby said container means is removable from said support ring.

5. Apparatus as recited in claim 2 wherein said support includes a counter and a vertical panel, said vibrating means being mounted on said vertical panel at said sifter station and including an electric motor and means for converting rotary motion of said motor to reciprocal motion for driving said support ring.

6. Apparatus as recited in claim 1 wherein said collector means includes:
   i) a collection vessel, and
   ii) chute means for directing residual material from the coating station to said collection vessel, said chute means being disposed between said counter and said collection vessel.

7. Apparatus as recited in claim 6 wherein said chute means includes first and second sloped walls forming a gap therebetween whereby surfaces on said walls direct residual material into said collection vessel.

8. Apparatus as recited in claim 6 wherein the material is coated with a liquid prior to the application of the material and said chute means includes first and second sloped walls forming a gap therebetween whereby surfaces on said walls reduce the transfer of liquid from the coating station to the collection vessel.

9. Apparatus for breading food comprising:
   A) a support having a counter and a vertical panel extending above said counter that define the locations of a wetting site and a breading site and, at the breading site in vertical alignment, a sifter station spaced above said counter, a coating station intermediate the sifter location and said counter and a collection station extending downwardly from said counter,
   B) a batter receptacle supported in said counter at the wetting site containing a batter that is applied to the food,
   C) a dipping basket that receives the food for applying the batter, and
   D) the breading site including:
      i) a sifter assembly attached to said vertical panel at the sifter station that produces a shower of sifted dry particulate breading material that falls from said sifter assembly past the coating station to the collector station, ii) a dry coating basket that receives the batter coated food for being positioned in the coating station when said sifter assembly operates, and iii) a collector carried by said counter at the collector station whereby during operation of said sifter assembly batter-covered food in said dry coating basket is coated with dry particulate breading material in the shower and said collector receives residual material that fails to coat the food in said dry coating basket.

10. Breading apparatus as recited in claim 9 wherein said sifter assembly comprises:
   i) a container including a peripheral housing and spanning screen for receiving dry particulate material, and
   ii) an electrically operated vibrator connected to said vertical panel for vibrating said container thereby to produce the shower of dry particulate breading material.

11. Breading apparatus as recited in claim 10 wherein said vibrator includes:
   a) means on said vertical panel for producing rotary motion,
   b) means on said vertical panel for converting rotary motion to reciprocal motion,
   c) a support ring attached to said rotary motion conversion means for receiving said housing, and
   d) a bracket that carries said support ring for motion in a horizontal plane.

12. Apparatus as recited in claim 11 wherein said peripheral housing includes an extension for passing through said support ring whereby said container means is removable from said support ring.

13. Apparatus as recited in claim 10 wherein said rotary motion means comprises an electric motor mounted on said vertical panel at the sifter station.

14. Apparatus as recited in claim 9 wherein said collector includes:
   i) a collection vessel, and
   ii) a chute that directs residual material from the coating station to said collection vessel.

15. Apparatus as recited in claim 14 wherein said chute includes first and second sloped walls forming a gap therebetween whereby surfaces on said walls direct residual material into said collection vessel.

16. Breading apparatus as recited in claim 15 including stirring means at said wetting site for stirring batter in said batter receptacle.

17. Breading apparatus as recited in claim 15 including an electromagnetic stirrer at said wetting site for stirring batter in said batter receptacle.

18. Breading apparatus for food items comprising:
   A) a cabinet having a counter and a vertical back panel that define a batter application site and a breading application site and having at least one compartment below said counter at each of said batter and breading application sites, said counter having first and second openings therethrough at the batter and breading application sites, respectively,
   B) a wet coating assembly at the batter application site having:
      i) a batter bowl supported by said counter at said first opening for containing a volume of batter, and
      ii) a dipping basket for dipping food items in the batter in said batter bowl whereby an operator is enabled to coat the food items in the batter and drain excess batter back into the batter bowl, and
   C) a dry coating assembly at the breading application site having, in a vertical alignment, a sifter station mounted above said counter on said vertical back panel, a coating station intermediate the sifter station and said counter, and a collection station extending downwardly from said counter into the batter application compartment,
      i) a dry coating basket for enabling the operator to transfer coated food items from said dipping basket to a breading position at the coating station,
      ii) an electrically operated sifter attached to said vertical planar back panel at the sifting station for producing a shower of sifted breading material, some of which adheres to coated food items in said dry coating basket in the coating station, said sifter having:
         a) an electrically operated drive for producing reciprocating motion,
         b) a switch for controlling the operation of said drive,
         c) a support ring,
         d) spaced, parallel rails attached to said vertical back panel proximate said drive for enabling said support ring to reciprocate in a plane normal to the plane of said vertical back panel,
         e) detachable connection means for connecting said support ring to said drive, and
         f) a tray removably carried in said support ring having a screen thereacross for sifting breading material placed in said tray when said tray reciprocates with said ring, and
      iii) a collector at the said collector station supported by said counter, said collector including:
         a) a chute having a support flange and first and second sloped walls extending relative to said support flange to form a gap therebetween, and
         b) a collection vessel in the compartment below said counter at the beading application site and aligned with said chute whereby said chute directs the remaining portion of the shower including dough balls to said collection vessel, whereby said collection vessel is removable from the compartment to permit a transfer of its contents back to the sifter and whereby said sifter tray accumulates dough boys for disposal by removing said sifter tray.

19. Apparatus as recited in claim 18 wherein said sifter tray comprises a cylindrical housing for supporting said screen, said cylindrical housing having an upper wall thereby to define an open-top volume for receiving the dry particulate breading material on said screen, a lower wall for being inserted through an opening in said ring and an intermediate circumferential bead for engaging said support ring adjacent the periphery of the opening therethrough.

20. Apparatus as recited in claim 18 wherein each of said spaced, parallel rails and said support ring include counter-facing, abutting low-friction slides for facilitating the reciprocation of said support ring.

* * * * *